3,129,254
PREPARATION OF FLUORINATED OLEFINS
Richard F. Heine, White Bear Lake, Minn., assignor to Minnesota Mining and Manufacturing Company, St. Paul, Minn., a corporation of Delaware
No Drawing. Filed Jan. 23, 1961, Ser. No. 83,931
4 Claims. (Cl. 260—649)

This invention relates to a new and useful method of producing 1-aryl perfluoroalkene-1s.

These compounds are disclosed in U.S. Patent No. 2,874,197 and are said to be useful as intermediates and as non-corrosive, non-flammable materials which cause little or no swelling when placed in contact with rubber and synthetic elastomeric material, and in hydroelectric systems which operate at high temperatures.

In accordance with my discovery, I have found that compounds having the general formula $$R-CF=CF(CF_2)_{n-1}F$$

where R is an aryl radical such as phenyl, tolyl, naphthyl, biphenyl and substituted derivatives thereof, and $n$ is an integer less than 20 (preferably 3 to 7), may be prepared by reaction with a perfluoroalkanesulfonyl fluoride of the general structural formula $$F(CF_2)_{n-1}CF_2CF_2SO_2F$$

where $n$ is as above, with a stable anhydrous solution of an aromatic organo-lithium compound in which the lithium is attached directly to the aromatic nucleus. This reaction is carried out at temperatures below 40° C. and preferably in the range of −80° to 0° C. The preferred solvents are ethers such as diethyl ether, di-isopropyl ether, tetra-hydrofuran, dioxane, etc.

Preferred Embodiment

Absolute diethyl ether (500 ml.), small pieces of lithium wire (8.4 grams) and bromobenzene (94.2 grams) were mixed in a one-liter flask. After the initial exotherm had subsided, the mixture was refluxed with stirring until all the lithium had been consumed. The phenyl lithium-ether solution was cooled in a Dry Ice acetone bath while perfluorooctanesulfonyl fluoride (100 grams) was slowly added with stirring. The mixture was then added to cold, dilute aqueous hydrochloric acid. The resulting ether layer was separated, dried and evaporated. Distillation of the residue after evaporation of the ether was performed under vacuum and produced two fractions:

The first fraction had a boiling range of 40–60° C. at 2 mm. and was largely unreacting starting material; and, The second fraction had a boiling point of 60–62° C. at 2 mm. The second fraction had a refractive index $(n_d{}^{25})$ of 1.3970 and contained 38.2% carbon and 61.1% fluorine. The infrared spectrum for the second fraction, $$C_6H_5CF=CF(CF_2)_6F$$

was identical to that of a sample of $$C_6H_5CF=CF(CF_2)_5F$$

prepared by reacting $$F(CF_2)_5CF=CF_2$$

with phenyl lithium in accordance with the teachings of U.S. Patent No. 2,874,197. Absorption bands indicative of an aromatic nucleus and a fluoroolefin double bond were also observed in the infrared spectrum of the second fraction.

By decreasing the amount of sulfonyl fluoride to be added and, accordingly, increasing the ratio of phenyl lithium under the same conditions, it was possible to replace additional vinylic fluorine atoms with phenyl groups. By reducing the ratio of phenyl lithium, the perfluoroolefin, $$CF_2=CF(CF_2)_6F$$

in small amounts was observed in the reaction mixture. Accordingly, in order to favor the production of compounds having the formula $$RCF=CF(CF_2)_{n-1}F$$

where R and $n$ are as defined above, at least 1 mol, preferably at least 2 mols, of the aromatic organo-lithium compound should be employed per mol of the sulfonyl fluoride.

I claim:

1. A process for preparing a compound of the general structural formula $$RCF=CF(CF_2)_{n-1}F$$

where R is an aryl radical selected from the group consisting of phenyl, tolyl, naphthyl and biphenyl radicals and $n$ is an integer less than 20 which comprises contacting a perfluoroalkanesulfonyl fluoride of the formula $$F(CF_2)_{n-1}CF_2CF_2SO_2F$$

where $n$ is an integer less than 20 with an anhydrous solution of an aromatic lithium compound selected from the group consisting of phenyl lithium, tolyl lithium, naphthyl lithium and biphenyl lithium under anhydrous conditions, maintaining the reaction mixture at a temperature below 40° C., and recovering said compound from the reaction mixture.

2. The process of claim 1 in which the perfluoroalkanesulfonyl fluoride is perfluorooctanesulfonyl fluoride.

3. A process for preparing a compound of the general structural formula $$RCF=CF(CF_2)_{n-1}F$$

where R is an aryl radical selected from the group consisting of phenyl, tolyl, naphthyl and biphenyl radicals and $n$ is 3 to 7 which comprises contacting a perfluoroalkanesulfonyl fluoride of the formula $$F(CF_2)_{n-1}CF_2CF_2SO_2F$$

where $n$ is 3 to 7 with an anhydrous di-ethyl ether solution of an aromatic lithium compound selected from the group consisting of phenyl lithium, tolyl lithium, naphthyl lithium and biphenyl lithium under anhydrous conditions, maintaining the reaction mixture at a temperature below 40° C., and recovering said compound from the reaction mixture.

4. A process for preparing a compound of the general structural formula $$RCF=CF(CF_2)_{n-1}F$$

where R is an aryl radical selected from the group consisting of phenyl, tolyl, naphthyl and biphenyl radicals and $n$ is an integer less than 20 which comprises contacting a perfluoroalkanesulfonyl fluoride of the formula $$F(CF_2)_{n-1}CF_2CF_2SO_2F$$

where $n$ is an integer less than 20 with an anhydrous solution of an aromatic lithium compound selected from the group consisting of phenyl lithium, tolyl lithium, naphthyl lithium and biphenyl lithium under anhydrous conditions, maintaining the reaction mixture at a temperature below 0° C., and recovering said compound from the reaction mixture.

References Cited in the file of this patent
UNITED STATES PATENTS
2,874,197   Dixon _____ Feb. 17, 1959